3,031,718
FORMING AND TRIMMING HOLLOW PLASTIC ARTICLES

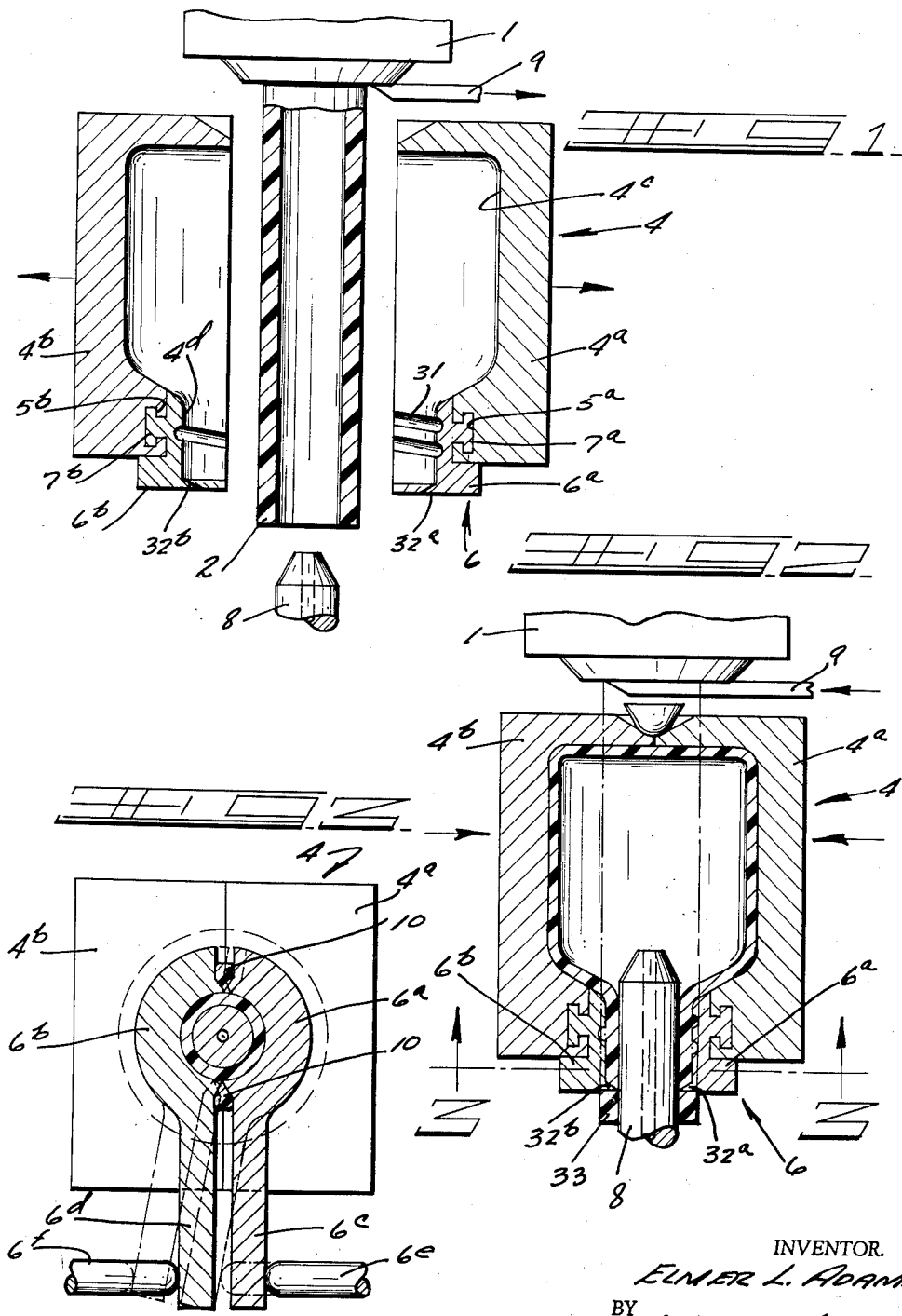

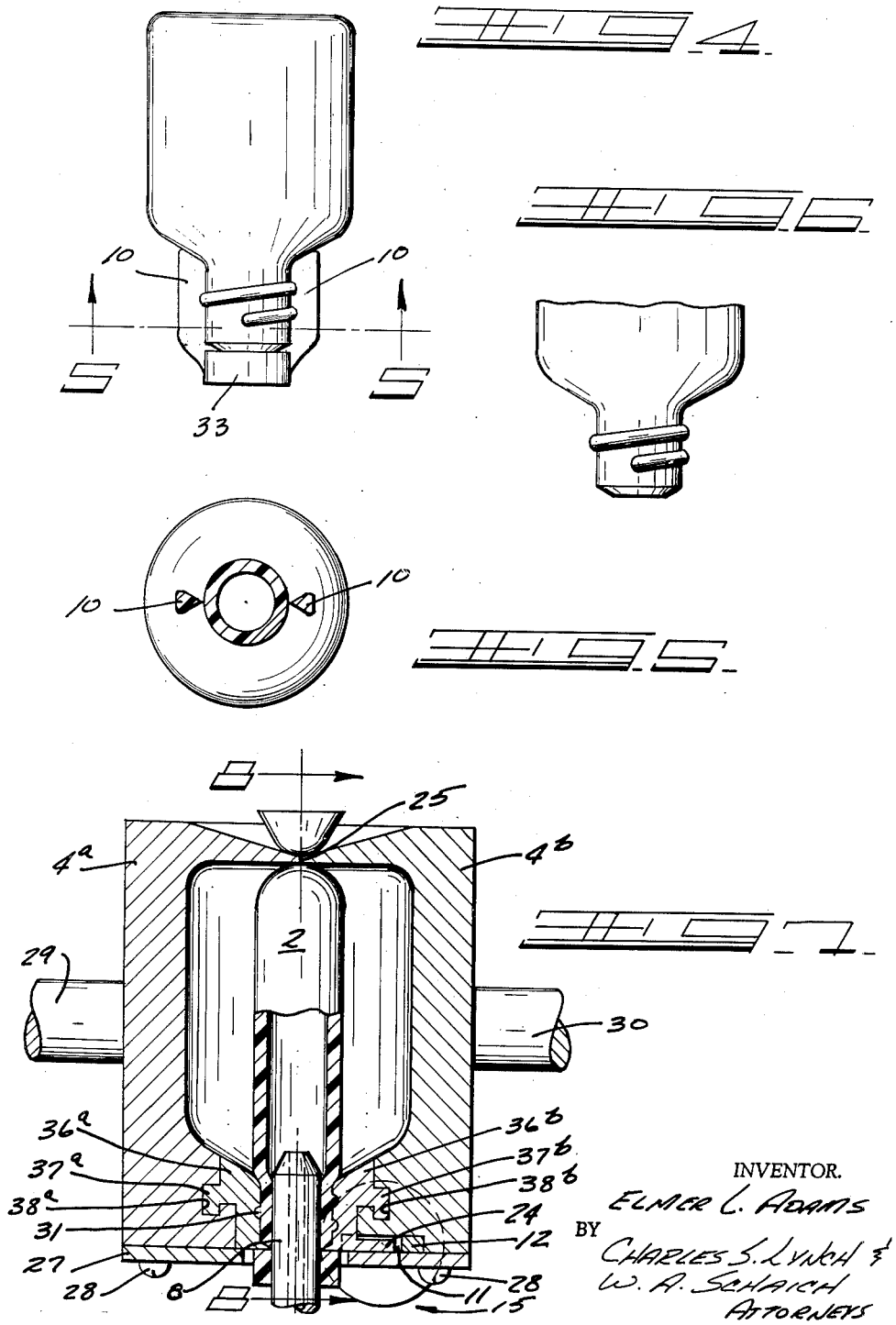

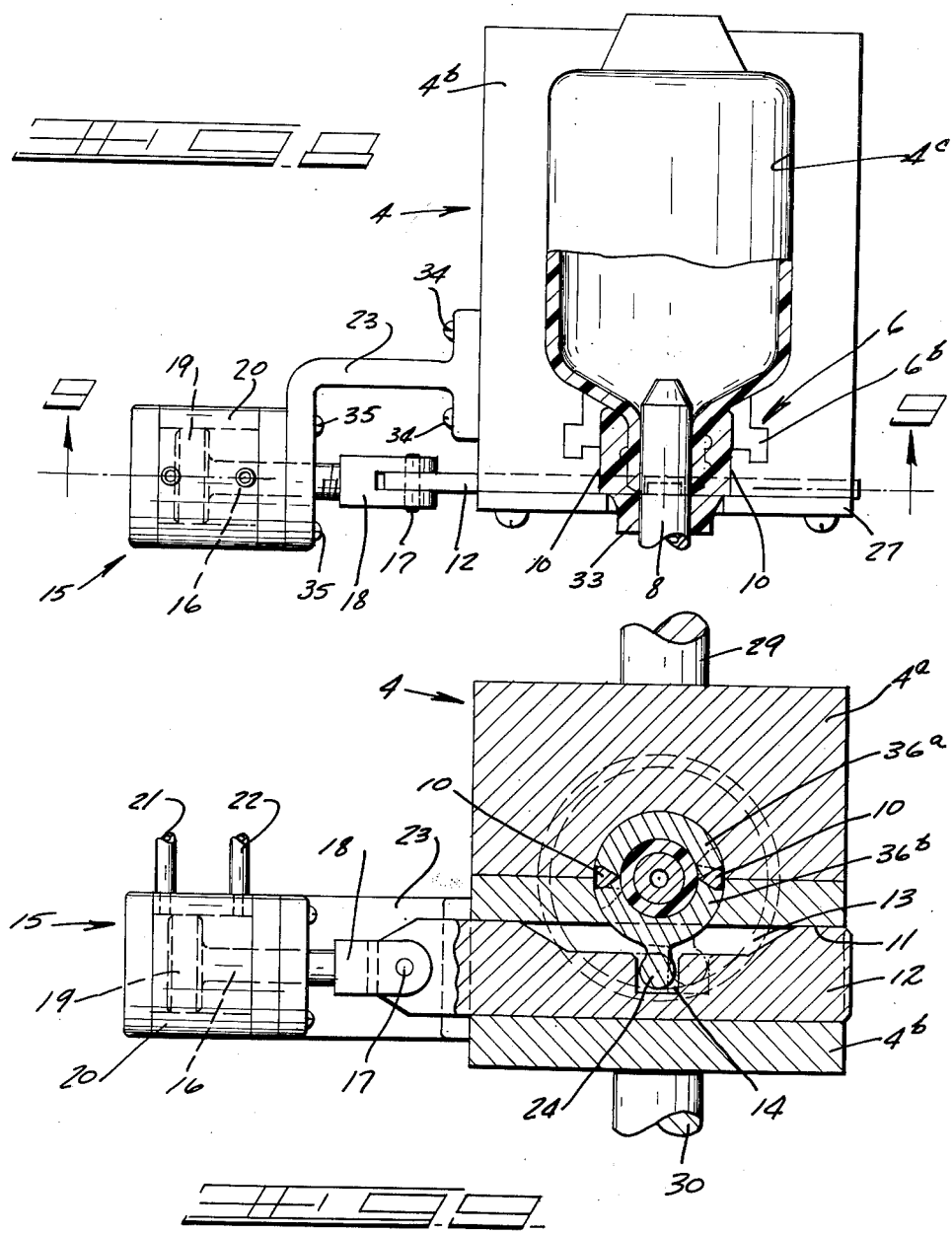

Elmer L. Adams, Toledo, Ohio, assignor to Owens-Illinois Glass Company, a corporation of Ohio
Filed Oct. 21, 1959, Ser. No. 847,749
12 Claims. (Cl. 18—5)

The present invention relates to improvements in the method and apparatus for forming hollow plastic articles having a reduced end portion or the like. The methods heretofore employed in making thermoplastic articles involved extruding a tube of heated thermoplastic material and closing a partible mold over the tube and about a blow mandrel. Whenever the diameter of the tubing exceeds that of any portion of the mold cavity, flashing of the thermoplastic material would occur along the line of contact of the mold halves. Such flashing has been particularly troublesome in the blowing of containers having reduced neck portions since the flash is formed along the neck portion. Such flashing would have to be removed after the article had been taken from the mold and usually this operation was done by hand. A second method sometimes employed in making thermoplastic containers involves extruding the tube of thermoplastic material between the halves of a partible mold, closing the mold over the tube, and then inserting the blow mandrel through the open neck end of the mold. This method also would cause flashing at the neck forming region due to the fact that the tubing is highly compressed between the blow mandrel and the neck forming portion of the mold.

Accordingly it is an object of this invention to provide an improved method and apparatus for automatically forming and trimming blown plastic articles.

A further object of the invention is to provide a method and apparatus for trimming flash from molded articles prior to removal from the mold.

Another object is to provide an apparatus which will form a thermoplastic article and sever the flash at the flash producing region of the mold from the molded articles.

A particular object of this invention is to provide an improved method and apparatus for automatically forming and trimming hollow plastic articles having a reduced neck portion.

The specific nature of this invention as well as other objects and advantages thereof will become apparent to those skilled in the art from the following detailed description thereof taken in conjunction with the annexed sheets of drawings, on which, by way of preferred example only, are illustrated two embodiments of this invention.

FIG. 1 is a schematic vertical cross-sectional view of a molding apparatus embodying this invention with the elements thereof in their starting position.

FIG. 2 is a view similar to FIG. 1 but with the elements shown in their blowing position.

FIG. 3 is a cross-sectional view taken along the line 3—3 of FIG. 2.

FIG. 4 is an elevational view of an article formed by existing methods showing the adhering flash.

FIG. 5 is a sectional view taken along the line 5—5 of FIG. 4.

FIG. 6 is an elevational view of the neck region of an article made in accordance with the invention.

FIG. 7 is a vertical cross-sectional view of a second embodiment of the apparatus of the invention.

FIG. 8 is a cross-sectional view taken along line 8—8 of FIG. 7.

FIG. 9 is a cross-sectional view taken along line 9—9 of FIG. 8.

This invention is primarily concerned with providing a method and apparatus whereby the flashing can be automatically removed from the blown article before the article is removed from the mold. This is accomplished by imparting a twisting action to the flash to sever such flash from the blown article while the blown article is still supported in the mold. This step may be conveniently accomplished by constructing the mold in such fashion that the flash producing portions of the mold are shiftable relative to the remainder of the mold. For a container mold, such shiftable portion usually comprises the neck forming region. By providing such shiftable portion, it is possible to sever the flash from the article prior to taking the article from the mold. This, then, makes the forming of plastic articles completely automatic from the extruding step to the completion of a finished article.

Referring to FIGS. 1-3 of the drawings, there is shown an extrusion head or nozzle 1 through which a length of heated thermoplastic tubing 2 is vertically downwardly extruded. The partible mold 4 is disposed beneath the nozzle 1 and comprises two half sections 4a and 4b which are relatively movable in a horizontal plane between spaced open positions, as shown in FIG. 1, and closed abutting molding positions, as shown in FIG. 2. As is well known in this art, when a suitable length of tubing 2 has been extruded by nozzle 1, a blow nozzle 8 is inserted in the bottom open end of said tubing and the mold sections are then closed around the tubing 2. Generally the internal diameter of the tubing 2 exceeds the external diameter of the blow nozzle 8 to permit the ready insertion of the blow nozzle 8 into such tubing and at the same time, the external diameter of the tubing 2 generally exceeds the internal diameter of some portions of the molding cavity. Obviously, any portions of the molding cavity which have a smaller internal diameter than the external diameter of the tubing 2 will produce a flashing of a portion of such tubing between the mold sections when the mold sections 4a and 4b are moved to their closed positions. In the particular example illustrated in the drawings, the mold cavity 4c defines an inverted container shape and the neck portions 4d of such cavity constitute the flash producing portions of the mold.

In accordance with this invention, the flash produced between the mold sections is removed while the mold is closed by imparting an angular displacement of its flash relative to the closed mold. More particularly, the flash producing portions of the mold are mounted for rotational shifting movements relative to the remaining portions of the mold. This may be conveniently accomplished by utilizing cooperating semi-annular sleeve elements 6a and 6b in each of the mold sections 4a and 4b to define the flash producing sections of the partible mold. Thus semi-annular neck forming sleeves 6a and 6b are respectively shiftably mounted in the mold sections 4a and 4b to permit limited rotational movement of such neck forming sections with respect to the remainder of the mold.

In the closed position of the molds (FIG. 2), the neck forming sections 6a and 6b are in abutment and their internal surfaces define the neck forming portions of the container cavity 4c. On the periphery of neck sections 6a and 6b there are provided external semi-annular tongues 7a and 7b having a dove-tailed cross-sectional configuration. Cooperating dove-tailed annular grooves 5a and 5b are respectively provided in the mold sections 4a and 4b to respectively slidably receive the semi-annular tongues 7a and 7b. This tongue and groove arrangement will prevent axial movement of the neck forming sleeves 6a and 6b relative to the partible mold but allows relative rotational displacement of said sleeves with respect to the main body mold.

The sleeves 6a and 6b are respectively provided with semi-annular knife edges 32a and 32b at the bottom thereof so that upon closing of the mold sections, the knife edges 32a and 32b will almost sever the excess tubing 33 from the neck of the article being formed. The knife edges 32a and 32b thus determine the length of the neck of the article being made.

The rotatable sleeves 6a and 6b have operating extensions 6c and 6d integral therewith which extend radially outward from the partible mold and provide means for rotationally displacing the sleeves 6a and 6b relative to the remainder of the mold. Rotation of the sleeves 6a and 6b by means of the radially extending arms 6c and 6d can be effected by any mechanical arrangement, here schematically illustrated by shiftable actuators 6e and 6f. The dotted lines shown on FIG. 3 illustrate actuation of the radial arms by longitudinally movable actuators 6e and 6f resulting in a rotational displacement of the neck forming sleeves 6a and 6b.

The operation of the apparatus disclosed in FIGS. 1–3 is as follows: Thermoplastic tubing 2 is extruded from extruder 1 into the area between the partible mold sections 4a and 4b, the tubing 2 having a larger external diameter than the internal diameter of the neck forming sleeve 6. Thus, upon closing of the mold, flashing will occur at the neck forming region of the mold due to the fact that the tubing is larger than the mold and also due to the fact that the thermoplastic material will be highly compressed in the neck region between the sleeve 6 and the blow mandrel 8. Of course, the blow nozzle 8 may be inserted within the tubing 2 either before the mold is closed or after the mold is closed.

After the mold has been closed about the tubing 2, a severing knife 9 is operated to sever the tubing from the nozzle 1. Also, in a known manner, the closing of the mold pinches the tubing at the top end and closes the tubing to form the bottom wall or closed end of the article to be made. Fluid under pressure is introduced through the nozzle 8 and the tubing is expanded to conform to the internal shape of the mold 4. At this stage the blown article is formed as shown in FIG. 4 with the flash 10 integrally secured thereto. After sufficient cooling of the thermoplastic material has taken place so that it has begun to set or become rigid, the neck sleeves 6a and 6b are rotated a small amount thus severing the flash from the article. Inasmuch as the flash 10 not only extends along the side of the neck forming region of the article but also is connected to the excess tubing portion 33, rotation of the neck sleeves a slight amount will not only sever the flash 10 from the article but will also concurrently sever the excess portion 33 of tubing 2 from the article being formed. Thus it is clear that the article will be free of any flash when the mold is opened and the article is removed therefrom. The neck or finish of the article will be completely trimmed of flash, as illustrated in FIG. 6.

Referring to FIGS. 7–9, a second embodiment of the invention is shown, which differs from the first disclosed embodiment in the details of the movable sleeve elements and the mechanical arrangement for actuating these sleeve elements to sever the flash. The same reference numerals are used in referring to elements of structure common to both embodiments. As in the embodiment disclosed in FIGS. 1–3, an extrusion nozzle 1 extrudes heated thermoplastic tubing 2 vertically downward between mold sections 4a and 4b of a partible mold 4. The partible mold 4 has arms 29 and 30 extending from mold sections 4a and 4b, by which, through suitable actuating means (not shown), the mold sections may be moved to closed or open position. An elongated mandrel or blow nozzle 8, positioned below the mold 4, is mounted for vertical movement into the neck forming region of the mold and within the open end of the extruded tubing 2. Internal semi-annular grooves 38a and 38b are formed in the flash forming region of the mold sections 4a and 4b. Semi-annular sleeves 36a and 36b having external annular tongues 37a and 37b fit within the neck forming region of the mold sections 4a and 4b respectively and the tongues 37a and 37b are slidably received in the grooves 38a and 38b. Extending across the bottom of mold section 4b is a slot 11. An elongated slide member 12 having a cutaway portion 13 and notch 14 approximately midway of the length thereof is slidably received in the slot 11. The slide member 12 is connected, at one end, by a pin 17 and threaded connector 18 to a rod 16 which is longitudinally driven by means of a piston 19 operating in a cylinder 20. Fluid under pressure is supplied to the cylinder 20 by means of conduits 21 and 22 in a known manner. The semi-annular sleeve element 36b has a single radial extension 24 which extends into the slot 11 of the mold section 4b and is received in the notch 14 of the slide member 12. The slot 11 which extends across the length of the mold section 4b is closed at the bottom by means of a retaining plate 27 fixed to the mold section 4b by means of screws 28. The piston and cylinder arrangement, generally indicated as 15, used for actuating the slide member 12 may be mounted on the mold section 4b by means of a bracket 23 fastened to the mold at one end by screws 34 and fastened to the cylinder 20 by screws 35 at the other end. Inasmuch as the fluid supply conduits 21 and 22 for the fluid motor 15 are made of a flexible material, the fluid motor 15 is capable of moving with the mold section 4b during the opening and closing operations of the mold sections 4a and 4b.

The apparatus disclosed in FIGS. 7–9 operates in the following manner: The thermoplastic tubing is extruded between the mold sections 4a and 4b in the same manner as disclosed with respect to the operation of the embodiment disclosed in FIGS. 1–3 and the two mold sections 4a and 4b are moved toward each other while the mandrel 8 is moved into position within the thermoplastic tubing 2 and the neck forming semi-annular sleeve elements 36a and 36b. When the mold sections 4a and 4b are closed about the tubing, as shown in FIG. 7, the tubing is pinched closed at the upper part 25 of the mold thus closing off one end of the tubing. The closing of the mold also compresses the tubing 2 in the neck forming region defined by the semi-annular sleeves 36a and 36b and the tubing is compressed into the thread forming grooves 31. A suitable fluid under pressure is then introduced through the nozzle 8 thus expanding the closed tubing 2 to conform to the internal configuration of the mold sections 4a and 4b. After the expansion step has been completed and the thermoplastic material has cooled sufficiently to allow clean severing of the flash, fluid under pressure is introduced to the fluid motor 15 through conduit 21 resulting in a longitudinal movement of the slide 12 and slight rotation of the semi-annular sleeves 36a and 36b. This rotation of the sleeve elements 36a and 36b results in a severing of the flash which is produced at the neck forming region of the mold defined by the semi-annular sleeves 36a and 36b. This movement of the sleeve elements 36a and 36b, extension 24, and the slide 12 is illustrated in dotted lines in FIG. 9.

There are several distinct advantages to severing the flash from the formed article prior to removing the article from the mold. When the mold is closed and the article has been completely formed therein, the thermoplastic material to be severed is at a higher temperature than it would be when the article is normally removed from the mold. Because the material is at a higher temperature with the mold closed, severing of the flash is made easier. Also, with the article supported in the mold at the time the flash is severed, it is impossible for the operator to distort the finished article during the flash removing step. Thus, an easy, fool-proof method of trimming flash from blown plastic articles is accomplished.

From the foregoing, it can be seen that a relatively simple and inexpensive device has been devised for forming and trimming blown plastic articles. Furthermore, by providing a relatively movable sleeve in the neck forming portion of the partible mold wherein the sleeve may be rotated a slight amount to sever the flash while the article is still retained in the mold, the forming and trimming of plastic articles may be accomplished automatically and economically.

Modifications other than those described with reference to the two embodiments shown in the drawings and heretofore described will be apparent to those skilled in the art within the meaning and scope of the appended claims defining the invention.

I claim:

1. The method of trimming hollow plastic articles having a neck portion comprising inserting a heated tube of thermoplastic between the halves of a partible mold with a portion of said tube lying between the neck defining half portions of the partible mold, the diameter of the tube being in excess of the internal dimensions of said neck defining mold portions when closed, closing the partible mold, thereby displacing a portion of the thermoplastic material as flash forming the remainder of said material to the shape defined by the closed partible mold into an article, and trimming the article to finished form by oscillating said neck defining mold portions about the neck axis and relative to the remaining portions of the partible mold, thereby severing the flash portion of said material from the portion thereof in the formed article.

2. The method of trimming hollow plastic articles having a neck portion comprising: inserting a heated tube of thermoplastic between the separated halves of a partible mold with a portion of said tube lying between the neck defining half portions of the partible mold, the diameter of the tube being in excess of the internal dimensions of said neck defining mold portions when closed, closing the partible mold, thereby displacing a portion of the thermoplastic material as flash extending radially outward and confined between said neck defining mold half portions; concurrently with the mold closing, forming an annular constriction in the thermoplastic tube between the mold enclosed portions thereof and any excess portion projecting axially out of said neck defining mold portions; and oscillating said neck defining mold portions about the neck axis and relative to the remaining portions of the partible mold, thereby concurrently severing said flash and said excess portion of the thermoplastic tube from the formed article.

3. The method of forming and trimming hollow plastic articles having a neck portion comprising: inserting a heated tube of thermoplastic between the halves of a partible mold with a portion of said tube lying between the neck defining half portions of the partible mold, the diameter of the tube being in excess of the internal dimensions of said neck defining mold portions when closed; inserting a blow head within said tube portion; closing the partible mold on said tube, thereby radially outwardly displacing a portion of the thermoplastic material as flash confined between said neck defining mold half portions; concurrently with the mold closing, pinching the tube against said blow head to form an annuar constriction in the tube between the mold enclosed portions thereof and any excess portion projecting axially out of said neck defining mold portions; applying fluid pressure through said blow head to expand the mold enclosed portions of the thermoplastic tube; and oscillating said neck defining mold portions about the neck axis and relative to the remaining portions of the partible mold, thereby concurrently severing said flash and said excess portion of the thermoplastic tube from the formed article.

4. The method of forming and trimming flash from hollow molded plastic articles while said articles are in their mold comprising; inserting a heated tube of thermoplastic material between the halves of a partible mold with a portion of said tube lying between the flash producing portions of said mold, closing the partible mold, thereby displacing part of the thermoplastic material as flash at the flash producing portions of said mold, and imparting angular motion to the said flash producing mold portions relative to the remaining portions of the partible mold, thereby severing the flash.

5. The method of forming and trimming flash from hollow molded plastic articles while said articles are in their molds comprising; inserting a heated tube of thermoplastic material between the halves of a partible mold with a portion of said tube lying between the flash producing portions of said mold, closing the partible mold, thereby displacing part of the thermoplastic material as flash at the flash producing portions of said mold, and imparting motion to said flash producing portions of said mold relative to said article while said article is retained in the mold, thereby severing the flash.

6. The method of trimming hollow plastic articles having a reduced end portion comprising; inserting a heated tube of thermoplastic material between the halves of a partible mold with a portion of said tube lying between the regions of the mold which form the end portion, the maximum diameter of the tube being greater than the internal diameter of said regions of the partible mold when closed, closing the partible mold about said heated tube of thermoplastic material, thereby displacing part of the thermoplastic material as flash between said regions of the partible mold, and imparting angular motion to the said regions of the partible mold about the axis of the reduced end portion relative to the remaining portions of the partible mold, thereby severing said flash.

7. Apparatus for forming, from a length of heated thermoplastic tubing, hollow plastic articles having a reduced end portion comprising; a partible mold, said partible mold having a main body forming region and an end portion forming region of reduced cross-section, said end portion forming region of said partible mold being of lesser internal diameter than said tubing mounted on and movable relative to said main body forming region of said mold when said mold is closed, and means for imparting angular motion to said end portion forming region of said partible mold in a plane normal to the axis of said partible mold while maintaining the main body forming region stationary.

8. Apparatus for forming, from a length of heated thermoplastic tubing, hollow plastic articles having a neck portion comprising; a partible mold, said mold having a main body defining region and a neck defining region, said neck defining region being in the form of a two part internal sleeve, said neck defining sleeve being of smaller internal diameter than the external diameter of the tubing, when the mold is closed, and means for angularly displacing said sleeve with respect to the main body defining region.

9. The apparatus as defined in claim 8, wherein said means for angularly displacing said sleeve comprises a radially extending arm connected to each half sleeve respectively, and means for engaging said arms and moving said arms in a plane normal to the axis of the mold.

10. The apparatus as defined in claim 8, wherein said partible mold is provided with an internal annular groove at the neck defining region and said sleeve is provided with an annular tongue slidable in said groove.

11. The apparatus as defined in claim 8, wherein the means for angularly displacing said sleeve comprises a slide element coupled to said sleeve and means for reciprocating said slide element.

12. The apparatus as defined in claim 11, wherein said partible mold has a lateral slot extending across the width of one half section of the mold at the neck forming end thereof, and said slide element is mounted for reciprocating movement in said slot.

References Cited in the file of this patent
UNITED STATES PATENTS

| | | |
|---|---|---|
| 2,349,177 | Kopitke | May 16, 1944 |
| 2,541,249 | Hobson | Feb. 13, 1951 |
| 2,810,934 | Bailey | Oct. 29, 1957 |
| 2,890,483 | Soubier | June 16, 1959 |
| 2,903,740 | Parfrey | Sept. 15, 1959 |
| 2,928,120 | Leghorn et al. | Mar. 15, 1960 |